(12) United States Patent
Mac Donald

(10) Patent No.: US 7,351,119 B2
(45) Date of Patent: Apr. 1, 2008

(54) BATTERY CABLE CLAMP

(76) Inventor: Angus Bryden Mac Donald, 313 Brook Side Street, Glace Bay, Nova Scotia (CA) B1A-1M6

( * ) Notice: Subject to any disclaimer, the term of this patent is extended or adjusted under 35 U.S.C. 154(b) by 0 days.

(21) Appl. No.: 10/858,346

(22) Filed: Jun. 2, 2004

(65) Prior Publication Data
US 2005/0250390 A1    Nov. 10, 2005

(30) Foreign Application Priority Data
May 10, 2004    (CA)    .................... 2438678

(51) Int. Cl.
*H01R 4/48* (2006.01)
(52) U.S. Cl. ..................... 439/759; 439/772
(58) Field of Classification Search ............... 439/759, 439/756, 772, 773, 774, 754, 816, 817
See application file for complete search history.

(56) References Cited

U.S. PATENT DOCUMENTS

| | | | | |
|---|---|---|---|---|
| 2,860,320 A | * | 11/1958 | Goodnight | ................... 439/759 |
| 3,764,961 A | * | 10/1973 | Poitras | ....................... 439/759 |
| 5,269,709 A | * | 12/1993 | Eriksson | ...................... 439/772 |
| 5,861,223 A | * | 1/1999 | Motlagh | ...................... 429/121 |
| 6,203,382 B1 | * | 3/2001 | Frisby | ......................... 439/757 |
| 6,254,438 B1 | * | 7/2001 | Gaunt | ......................... 439/755 |

* cited by examiner

*Primary Examiner*—Hien Vu
(74) *Attorney, Agent, or Firm*—Frank J. Bonini, Jr.; John F. A. Earley, III; Harding, Earley, Follmer & Frailey

(57) ABSTRACT

This invention is an improved battery booster cable and clamp apparatus that operates in conjunction with a two piece split electrically conductive housing that is adapted to allow a battery terminal to reside therein, the two pieces of the housing being slid into or away from gripping contact with the terminal along a connecting base plate by utilizing a spring energized buckle or clamp assembly.

10 Claims, 3 Drawing Sheets

BATTERY CABLE CLAMP

BACKGROUND OF THE INVENTION

The present invention relates generally to a battery booster cable, and more particularly, to a clamp assembly that is used in connection therewith for removable securement to a battery post terminal, which does not require the use of any installation tools, and which provides greater ease in attachment/detachment from a conventional battery terminal post.

Battery "booster" or "jumper" cables are well known in the art for electrically interconnecting a discharged battery of a stalled vehicle in parallel with an external source of electrical energy, typically the charged battery of another vehicle. This is done to draw sufficient current from the charged battery to temporarily increase the capacity of the discharged battery, thereby allowing the stalled vehicle to be started. Typically, a pair of electrically conductive cables are joined together in side-by-side relationship to form a single booster cable which is easy to transport. Each cable has a pair of hand operated clamps at opposite ends thereof for securely interconnecting the cables to the corresponding terminals on the charged and discharged batteries. One pair of opposing clamps are denoted as being connected to a negatively charged cable, and the other pair of opposing clamps are denoted as being connected to a positively charged cable. Typically, the clamps are labeled in some manner to indicate attachment to the positive or negative cable, such as by providing insulated red handles for the positive clamps and insulated black handles for the negative clamps. To charge a battery, the opposing positive clamps of the positive cable are secured to the corresponding positive terminals of the charged and discharged batteries. One of the negative clamps on the negative cable is connected to the negative terminal of the charged battery, and the opposite negative clamp is connected to a ground connection of the stalled vehicle.

The clamps are typically configured with a pivot pin joining cooperating jaw portions at one end and handle portions at the other. A spring operably engages the handle portions to force the handle portions apart and urge the jaw portions toward a closed position. The jaw portions can be forcibly separated by gripping the handle portions and pivoting them toward each other. Release of the handles enables the jaws to close on the terminal of a battery. To facilitate securement of the jaws to the terminal, each jaw is typically provided with a serrated edge. However, release of the handles in such configurations of cable clamps to enable the jaws to close on the terminal of a battery can be cumbersome and difficult, and may not provide for a battery clamp which can which can be quickly engaged and disengaged from a battery post, or to engage and disengage the battery post without the need of any installation tooling. In use, the serrated edge often does not allow an adequate amount of surface contact with the battery's electrical terminal. This can cause arcing of the current in the vicinity of this connection possibly leading to ignition of the hydrogen gas evolved in the jumping or boosting process.

Previous booster cable devices lack the positive, secure and safe connectability of the present invention. These drawbacks have prevented the widespread usage of booster cable by those not knowledgable in automotive technology or electrical circuitry. Thus, there is a need for an improved battery booster cable and clamp assembly which can be quickly and safely engaged and disengaged from a battery post, and, in being placed upon the battery post, which applies a securing force equally along the entire surface area of the extended battery posts to secure the clamp assembly thereto, therein overcoming the abovementioned drawbacks.

SUMMARY OF THE INVENTION

In accordance with the invention, an object of the present invention is to provide an improved battery booster cable and clamp apparatus that operates in conjunction with a two piece split electrically conductive housing that is brought into or away from close proximity with a battery terminal by a buckle/clamp assembly.

Another object of the present invention is to provide an improved battery booster cable and clamp assembly for use with a conventional battery having an upwardly extending battery post, which can be quickly engaged and disengaged from a conventional and upwardly extending battery post, as well as the ability to engage and disengage the battery post without the need of any installation tooling.

It is a further object of the present invention to provide an improved battery booster cable and clamp assembly which can be engaged and disengaged from a conventional and upwardly extending battery post while being able to accommodate dimensional variations in the generally conical and tapered shaped construction of the battery posts.

It is a still further object of the present invention to provide an improved battery booster cable and clamp assembly which possesses the ability to secure the battery booster cable and clamp assembly to the battery post, and, in so doing, applying the securing force equally along the entire surface area of the extended battery posts, as opposed to the securing force being applied solely to each side of the battery post, as with conventional battery cable clamping mechanisms.

According to one aspect of the present invention, there is provided a battery cable clamp that can be placed on a battery contact of a battery comprising a main body portion defining a battery contact receiving opening therein, the main body portion having a plurality of securing openings on a bottom surface thereof; a sliding plate connected to the bottom surface of the main body portion, the sliding plate defining a battery contact receiving opening therein which corresponds substantially with the battery contact receiving opening in the main body portion, wherein the battery contact openings co-operatively enable the main body portion and the sliding plate to receive the battery contact of the battery, and wherein the sliding plate possesses a first set of securing openings defined therein which enable a first securing means to be passed therethrough to rigidly connect the sliding plate to the main body portion, and a second set of elongated securing openings defined therein which enable a second securing means to be passed therethrough to movably attach the sliding plate to the main body portion, a handle which is pivotally connected to an upper surface of the main body portion; a ring member having a distal and proximal end, the distal end of the ring member being engaged with a front portion of the main body portion, and the proximal end of the ring member being engaged with the handle, wherein when the handle is moved from an open position to a closed position the ring member is biased downwardly in relation to the main body portion by the handle assuming the closed position, and the second securing means are operably able to slide withing the second set of elongated openings on the sliding plate and thus permit restricted movement of the sliding plate in relation to the main body portion so as to bring the battery cable clamp into tight connection with the battery contact of the battery.

According to another aspect of the present invention, there is provided a battery cable clamp that can be placed on a battery contact of a battery comprising a main body portion defining a battery contact receiving opening therein at one end and a battery cable receiving opening for attachment to a battery cable at an opposite end, the main body portion having a plurality of securing openings on a bottom surface thereof; a sliding plate connected to the bottom surface of the main body portion, the sliding plate defining a battery contact receiving opening therein which corresponds substantially with the battery contact receiving opening in the main body portion, the battery contact receiving opening of the sliding plate being slightly larger in diameter than a diameter of the battery contact receiving opening of the main body portion, wherein the battery contact openings co-operatively enable the main body portion and the sliding plate to receive the battery contact of the battery, and wherein the sliding plate possesses a first set of securing openings defined therein which enable a first securing means to be passed therethrough to rigidly connect the sliding plate to the main body portion, and a second set of elongated securing openings defined therein which enable a second securing means to be passed therethrough to movably attach the sliding plate to the main body portion, a handle assembly which is pivotally connected to an upper surface of the main body portion; a ring member having a distal and proximal end, the distal end of the ring member being engaged with a front portion of the main body portion, and the proximal end of the ring member being engaged with the handle assembly, wherein when the handle assembly is moved from an open position to a closed position the ring member is biased downwardly in relation to the main body portion by the handle assembly assuming the closed position, and the second securing means are operably able to slide withing the second set of elongated openings on the sliding plate and thus permit restricted movement of the sliding plate in relation to the main body portion so as to bring the battery cable clamp into tight connection with the battery contact of the battery.

According to a still further aspect of the present invention, there is provided a method of making a battery cable clamp that can be placed on a battery contact of a battery comprising positioning a sliding plate in a bottom of a battery cable clamp forming mold, the sliding plate defining a battery contact receiving opening therein and possesses a plurality of securing openings defined therein; positioning rivets which extend upwardly through the plurality of securing openings in the sliding plate; scoring ends of the rivets; flanging the scored ends of the rivets outwardly; pouring lead into the mold so as to form a main body portion of the battery cable clamp, the lead engaging the flanged ends of the rivets so as to connect the sliding plate to the main body portion; positioning a handle assembly on an upper surface of the main body portion, the handle assembly being pivotally connected to the upper surface of the main body portion; and positioning a ring member having a distal and proximal end onto the battery cable clamp, the distal end of the ring member being engaged with a front portion of the main body portion, and the proximal end of the ring member being engaged with the handle assembly, wherein when the handle assembly is moved from an open position to a closed position the ring member is biased downwardly in relation to the main body portion by the handle assembly assuming the closed position so as to bring the battery cable clamp into tight connection with the battery contact of the battery.

As previously discussed, the advantage of the present invention is that it provides an improved battery booster cable and clamp assembly that can be quickly engaged and disengaged from a conventional and upwardly extending battery post, as well as the ability to engage and disengage the battery post without the need of any installation tooling.

A further advantage of the present invention is that it easily provides an improved battery booster cable and clamp assembly which can be engaged and disengaged from a conventional and upwardly extending battery post while being able to accommodate dimensional variations in the generally conical and tapered shaped construction of the battery posts.

A still further advantage of the present invention is to provide an improved battery booster cable and clamp assembly which possesses the ability to secure the battery booster cable and clamp assembly to the battery post, and, in so doing, applying the securing force equally along the entire surface area of the extended battery posts, as opposed to the securing force being applied solely to each side of the battery post, as with conventional battery cable clamping mechanisms.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

The battery cable clamp apparatus of the present invention, comprises a two part sectioned battery post contactor which is drawn together about a battery post in a sliding fashion along a lower attached base plate by an upper mounted buckle or latch mechanism.

Figure 1:
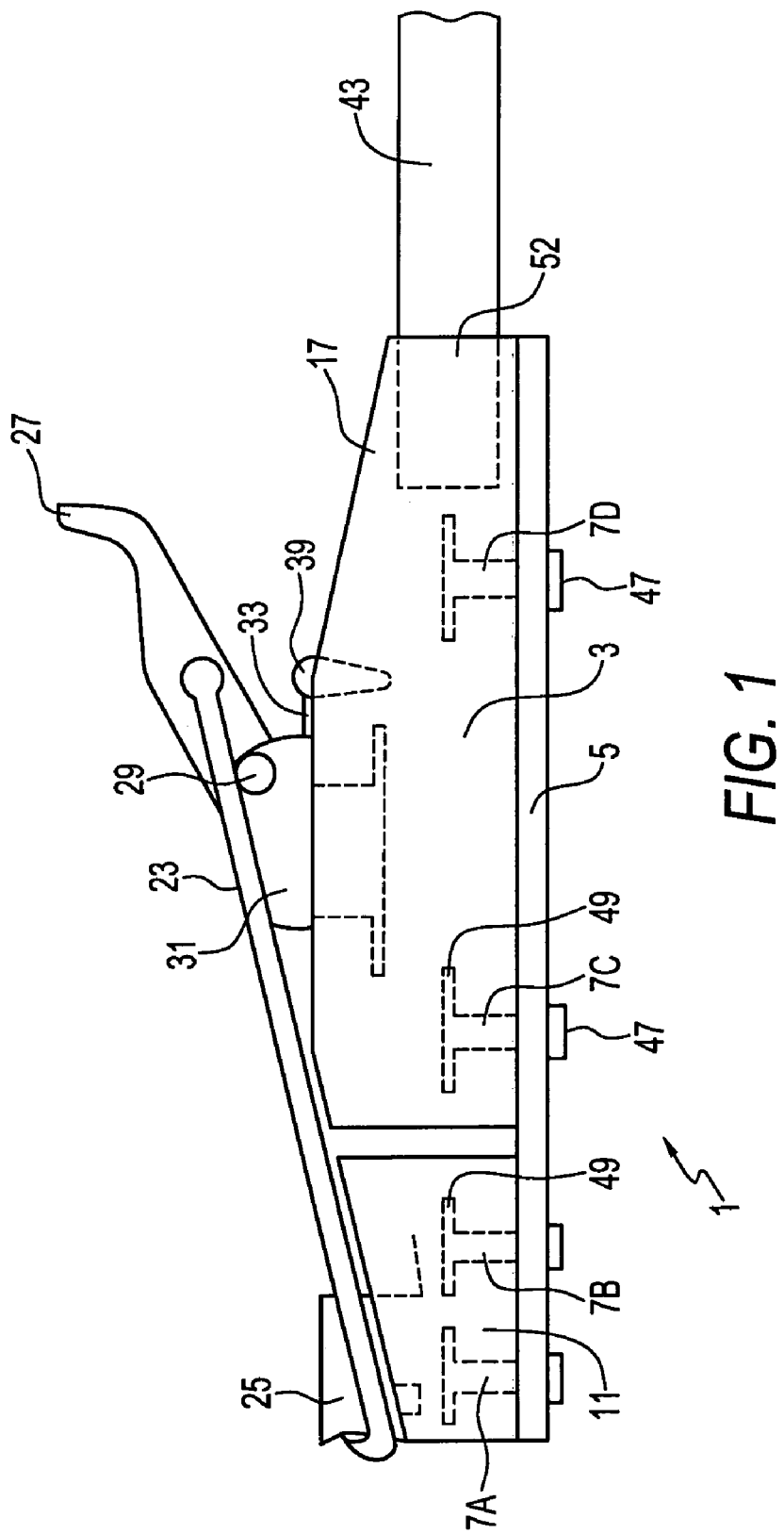
FIG. 1 is a partially transparent side view of the preferred embodiment battery clamp of the present invention, showing the lever clamp in the open position.

FIG. 1 illustrates a battery clamp 1 for use in connection therewith for removable securement to a battery post terminal (not shown). In a preferred embodiment, the battery clamp 1 comprises a main body portion 3, and a sliding plate 5 connected to the bottom of the main body portion 3, the sliding plate 5 being secured to the main body portion 3 with rivets (not shown) which can be imbedded into openings 7A–7D on the bottom of the main body portion 3. Preferably, the main body portion 3 is constructed from lead, and the sliding plate is constructed of steel, though it is also conceivable that other materials could be used, as would be apparent to a person skilled in the art.

Figure 2:
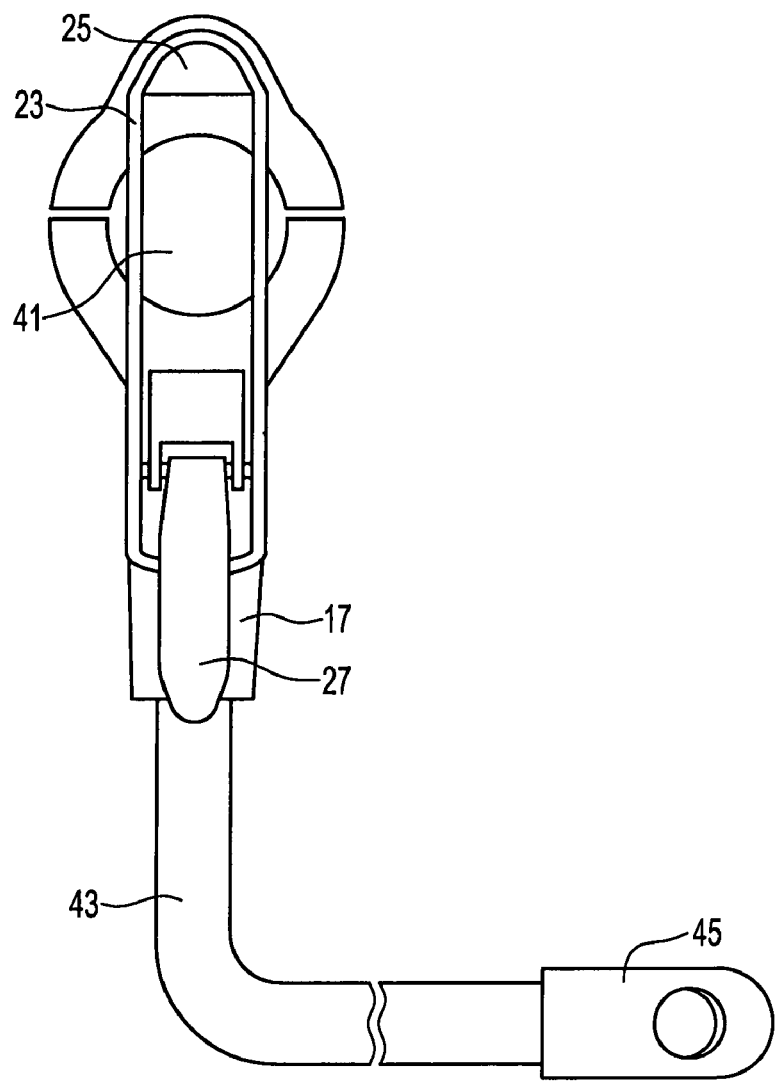
FIG. 2 is a top view of the preferred embodiment battery clamp of the present invention with the lever clamp handle in the closed position.
Figure 3:
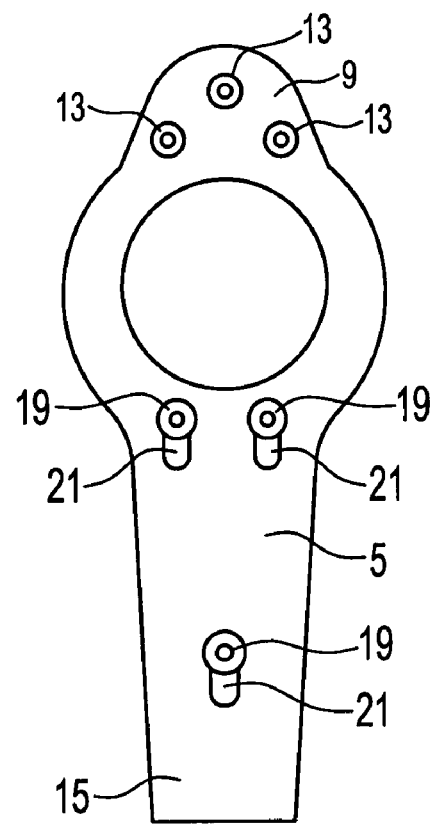
FIG. 3 is a a top view of the preferred embodiment battery clamp sliding plate of the present invention, and the rivets imbedded therethrough into the main body of the battery clamp to secure the sliding plate from moving.

FIG. 3 illustrates a bottom view of the sliding plate 5. The front end 9 of the sliding plate 5 is secured to the front end 11 of the bottom of the main body portion 3 by at least one rivet (not shown) which is passed through a securing apertures 13 which are defined in the front end 9 of the sliding plate 5 and through openings 7A and 7B on the bottom of the front end 11 of the main body portion 3, to connect the sliding plate 5 to the main body portion 3. In the preferred embodiment, three rivets are passed through securing apertures 13 to firmly connect the front end 9 of the sliding plate 5 to the front end 11 of the bottom of the main body portion 3. The sliding plate 5 and the main body portion 3 each correspondingly define, with reference to FIGS. 2 and 3, an opening 41 therein, whereby, when the sliding plate 5 is connected to the main body portion 3, the battery clamp 1 can be placed on to or removed off of a battery post terminal (not shown). Preferably, the opening in the sliding plate 5 is slightly larger than the opening in the main body portion 3, so as to accommodate dimensional variations in the generally conical and tapered shaped construction of battery posts.

Again with reference to FIGS. 1 and 2, the battery clamp 1 further comprises a resilient clamping member 23. One end of the resilient clamping member 23 is placed around a raised portion 25 on an upper surface of the front end 11 of the main body portion 3, and the other end of the resilient clamping member 23 is connected to a handle 27 pivotally connected by mechanical connector 29 to a connector plate 31. The clamping member 23 is positioned on an upper surface of the rear end 17 of the main body portion 3, enclosing a substantially hollow interior.

Figure 5:
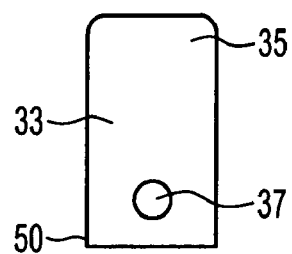
FIG. 5 illustrates a top view of the tension spring of the preferred embodiment battery clamp of the present invention, wherein the lever clamp handle is in a closed position and the battery clamp is firmly secured to a battery post.
Figure 6:
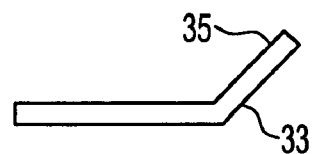
FIG. 6 is a side view of the tension spring of the Battery Clamp of the present invention.

With reference to FIG. 5 and FIG. 6, a tension spring 33 is positioned on top an upper surface of the rear end 17 of the main body portion 3, within the substantially hollow interior (not shown) of the connector plate 31, but underneath an end of the handle 27. The tension spring 33 is angled, as seen in FIG. 6, whereby a first end 35 of the tension spring 33, when placed within the substantially hollow interior (not shown) of the connector plate 31, is located in close proximation to the end of the handle 27. With reference to FIG. 5, the tension spring 33 also includes a second end 50 which defines an opening 37 therein, whereby the second end of the tension spring 33 can be secured into the upper surface of the rear end 17 of the main body portion 3, by a plethora of mechanical fasteners, for example, a screw or rivet 39, as seen in FIG. 1.

With reference to FIG. 3, the rear end 15 of the sliding plate 5 is secured to the rear end of the main body portion 5 (designated as reference numeral "17" in FIG. 1) by rivets 19 which are passed through additional securing apertures 21 defined in the rear end 15 of the sliding plate 5, into corresponding openings 7C and 7D on the bottom of the rear end 17 of the main body portion 3, so as to slidably connect the rear end of the sliding plate 5 to the bottom of the main body portion 3 by way of the rivets 19. The additional securing apertures 21 on the rear end 15 of the sliding plate 5 are different from the securing aperture 13 defined in the front end 9 of the sliding plate 5, in that the additional securing apertures 21 are slightly more elongated. Essentially then, when the sliding plate 5 is placed onto the main body portion 5, the front end 9 of the sliding plate 5 is forcibly secured to the bottom of the main body portion 3 by the rivets, and the rear end 15 of the sliding plate 5 is slidably secured to the bottom of the main body portion 3 by the rivets, a feature which importance will be more clearly defined herein.

In operation, and as stated previously, the front end 9 of the sliding plate 5 is firmly secured to the front end 11 of the bottom of the main body portion 5 by at least one rivet (not shown), and the rear end 15 of the sliding plate 5 is secured to the rear end 17 of the main body portion 3 by rivets in the elongated apertures 21 so as to slidably connect the rear end of the sliding plate 5 to the bottom of the main body portion 3. Once the battery clamp of the present invention has been placed over the battery post, the handle 27 is moved from an open position (as seen in FIG. 1) to a closed position (as seen in FIG. 2). In so doing, the handle 27 engages the angled end of the tension spring 33 and biases the angled end of the tension spring downwardly towards an upper surface of the rear end 17 of the main body portion 3.

By virtue of the resilient clamping member 23 being connected to the handle 27, the resilient clamping member 23 (being connected around the raised portion 25) is stretched as the handle 27 is forced away from the raised portion 25 in assuming a closed position, and, also as the end of the handle 27 engages and biases the angled end 35 of the tension spring 33, a tension force is applied to the battery clamp 1 to secure it firmly to the battery post. As the handle 27 assumes a closed position, the rivets 19 which pass through the elongated openings of the additional securing apertures 21 slide within these elongated openings, thus accommodating the tension force being applied to the battery clamp 1, and permitting a tight fit around the battery post. In removing the battery clamp 1 from the battery post, the handle 27 is opened, the rivets again slide within the elongated openings of the additional securing apertures 21 to decrease the tension force and permit the battery clamp 1 to be removed from the battery post. In essence then, the rivets 19 which are passed through the elongated openings of the additional securing apertures 21 in the rear end 15 of the sliding plate 5 are able to slide back and forth to easily permit tightening and loosening of the battery clamp 1 around the battery post.

Figure 4:
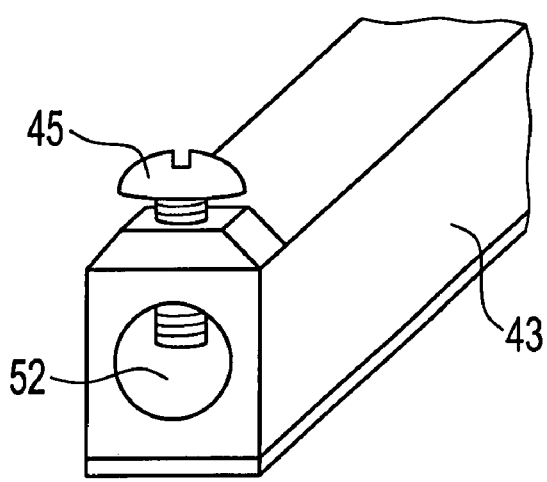
FIG. 4 is perspective view of the end of the battery clamp of the present invention shown with battery cable removed.

With reference to FIG. 4, there is shown an end of the battery clamp 1, with battery cable 43 removed. In the event portions of the battery cable 43 are worn or frayed, the worn areas can be trimmed, and the end of the battery clamp 1 removed and then the newly trimmed battery cable 43 re-inserted to the longitudinal aperture 52 defined therein battery clamp main portion 3. To secure the battery cable 43 to the battery clamp 1, a screw 45 can be passed through an opening in the upper surface of the end of the battery clamp1 to engagingly secure the battery clamp 1 to the battery cable 43. As can be seen in FIG. 2, the battery cable 43 has an end 45 thereof which is to be connected to an alternate power source.

With reference to FIG. 1, in making the battery clamp of the present invention, a sliding plate 5 is positioned in a bottom of a battery cable clamp forming mold (not shown), wherein rivets or screws are positioned upwardly through these openings in the sliding plate 5, the rivets or screws being designated generally as 47 in FIG. 1. Preferably, the ends of the rivets are then scored, and flanged outwardly, such as with pliers or other means. This flanging of the upper ends of the rivets or screws can be seen with reference to reference numeral 49 in FIG. 1. Then, lead (not shown) is poured into the mold so as to form the main body portion 3 of the battery cable clamp 1, the lead engaging the flanged ends 49 of the rivets 47 so as to connect the sliding plate 5 to the main body portion 3. Of course, the flanged ends 49 of the rivets 47, having lead formed around them, inhibits separation of the rivets 47 joining the sliding plate 5 to the main body portion 3. Excess lead formed in the elongated openings 21 on the sliding plate 5, is wiped away to enable the limited movement of the sliding plate 5 in relation to the main body portion 3. The handle 27 and assembly associated therewith can then be placed on the upper surface of the main body portion 3.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. For example, the handle may be made of a non electrically conducting material or have an electrically insulating surface coating. The reconfiguration of the elongated opening in the sliding plate would allow for the sliding movement of either or both of the portions of the main body.

Having thus described the invention, what is claimed as new and desired to be secured by Letters Patent is as follows:

1. A battery cable clamp that can be placed on a battery contact of a battery comprising:
    a main body portion defining a battery contact receiving opening therein, the main body portion having a plurality of securing openings on a bottom surface thereof;
    a sliding plate connected to the bottom surface of the main body portion, the sliding plate defining a battery contact receiving opening therein which corresponds substantially with the battery contact receiving opening in the main body portion, wherein the openings co-operatively enable the main body portion and the sliding plate to receive the battery contact of the battery, and wherein the sliding plate possesses a first set of securing openings defined therein which enable a first rivet to be passed therethrough to rigidly connect the sliding plate to the main body portion, and a second set of elongated securing openings defined therein which enable a second rivet to be passed therethrough to movably attach the sliding plate to the main body portion;
    a handle which is pivotally connected to an upper surface of the main body portion; and
    a clamping member having a distal and proximal end, the distal end of the clamping member being engaged with a front portion of the main body portion, and the proximal end of the clamping member being engaged with the handle, wherein when the handle is moved from an open position to a closed position the clamping member is biased downwardly in relation to the main body portion by the handle assuming the closed position, and the second securing means are operably able to slide withing the second set of elongated openings on the sliding plate and thus permit restricted movement of the sliding plate in relation to the main body portion so as to bring the battery cable clamp into tight connection with the battery contact of the battery wherein the handle is connected to an attachment block, the handle being pivotally connected to the attachment block;
    wherein the attachment block is positioned on the upper surface of the main body portion.

2. The battery cable clamp of claim 1, wherein the battery contact receiving opening of the sliding plate is slightly larger in diameter than a diameter of the battery contact receiving opening of the main body portion so as to permit attachment of the battery cable clamp to accommodate dimensional variations in battery contacts.

3. The battery cable clamp of claim 1, wherein the first set of securing openings positioned at an upper end of the sliding plate and the second set of elongated openings are positioned towards a rear end of the sliding plate.

4. The battery cable clamp of claim 1, wherein the first and second rivets are passed through the first and second securing openings in the sliding plate and the plurality of securing openings in the main body portion to connect the sliding plate and the main body portion to each other.

5. The battery cable clamp of claim 1, wherein the distal end of the clamping member is engaged with an upwardly extending shoulder area formed on the front portion of the main body portion.

6. The battery cable clamp of claim 1, wherein an interior of the attachment block is substantially hollow.

7. The battery cable clamp of claim 6, wherein a tension spring is positioned within the interior of the attachment block, and underneath an end portion of the handle.

8. The battery cable clamp of claim 7, wherein the tension spring further comprises a first end having an opening defined therein, and a second end which is angled upwardly in relation to the first end, the second end being positioned underneath the end portion of the handle, and said tension spring is secured to the upper surface of the main body portion by inserting a securing member through the opening of the first end of the tension spring into the upper surface of the main body portion, whereby, when the handle is moved from the open position to the closed position the end portion of the handle engages the angled second end of the tension spring, creating a tension force as the end portion of the handle biases the angled second end of the tension spring downwardly towards an upper surface of the main body portion, the tension force locking the battery cable clamp into the tight connection with the battery contact of the battery as the handle assumes the closed position.

9. The battery cable clamp of claim 1, wherein a rear end of the main body portion receives a battery cable, the battery cable being secured to the main body portion of the battery cable clamp by a screw or rivet which is passed through an opening in the upper surface of the rear end of the main body portion to engagingly secure the battery clamp to the battery cable.

10. A battery cable clamp that can be placed on a battery contact of a battery comprising:
    a main body portion defining a battery contact receiving opening therein at one end and a battery cable receiving opening for attachment to a battery cable at an opposite end, the main body portion having a plurality of securing openings on a bottom surface thereof;
    a sliding plate connected to the bottom surface of the main body portion, the sliding plate defining a battery contact receiving opening therein which corresponds substantially with the battery contact receiving opening in the main body portion, the battery contact receiving opening of the sliding plate being slightly larger in diameter than a diameter of the battery contact receiving opening of the main body portion, wherein the battery contact openings co-operatively enable the main body portion and the sliding plate to receive the battery contact of the battery, and wherein the sliding plate possesses a first set of securing openings defined therein which enable a first securing means to be passed therethrough to rigidly connect the sliding plate to the main body portion, and a second set of elongated securing openings defined therein which enable a second securing means to be passed therethrough to movably attach the sliding plate to the main body portion, a handle assembly which comprises a handle connected to an attachment block, the handle being pivotally connected to the attachment block, the attachment block being positioned on the upper surface of the main body portion;

a tension spring positioned within the interior of the attachment block, and underneath an end portion of the handle, further comprising a first end having an opening defined therein, and a second end which is angled upwardly in relation to the first end, the second end being positioned underneath the end portion of the handle, whereby, when the handle is moved from the open position to the closed position the end portion of the handle engages the angled second end of the tension spring, creating a tension force as the end portion of the handle biases the angled second end of the tension spring downwardly towards an upper surface of the main body portion, the tension force locking the battery cable clamp into the tight connection with the battery contact of the battery as the handle assumes the closed position;

a clamping member having a distal and proximal end, the distal end of the clamping member being engaged with a front portion of the main body portion, and the proximal end of the clamping member being engaged with the handle assembly, wherein when the handle assembly is moved from an open position to a closed position the clamping member is biased downwardly in relation to the main body portion by the handle assembly assuming the closed position, and the second securing means are operably able to slide withing the second set of elongated openings on the sliding plate and thus permit restricted movement of the sliding plate in relation to the main body portion so as to bring the battery cable clamp into tight connection with the battery contact of the battery.

* * * * *